(12) United States Patent
Kitamura et al.

(10) Patent No.: US 11,269,155 B2
(45) Date of Patent: Mar. 8, 2022

(54) IMAGING APPARATUS, IMAGING APPARATUS MANUFACTURING METHOD AND MOVING BODY

(71) Applicant: KYOCERA Corporation, Kyoto (JP)

(72) Inventors: Nobuo Kitamura, Tokyo (JP); Takahiro Okada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/649,967

(22) PCT Filed: Sep. 3, 2018

(86) PCT No.: PCT/JP2018/032588
§ 371 (c)(1),
(2) Date: Mar. 23, 2020

(87) PCT Pub. No.: WO2019/065102
PCT Pub. Date: Apr. 4, 2019

(65) Prior Publication Data
US 2020/0225438 A1 Jul. 16, 2020

(30) Foreign Application Priority Data
Sep. 27, 2017 (JP) .............................. JP2017-187198

(51) Int. Cl.
*G02B 7/02* (2021.01)
*G03B 17/02* (2021.01)
*H04N 5/225* (2006.01)

(52) U.S. Cl.
CPC ............... *G02B 7/02* (2013.01); *G03B 17/02* (2013.01); *H04N 5/2253* (2013.01); *H04N 5/2254* (2013.01)

(58) Field of Classification Search
CPC .... B60R 11/04; H04N 5/2253; H04N 5/2254; H04N 5/2252; G02B 7/02; G03B 17/02
USPC ............................. 257/435; 438/70; 348/374
See application file for complete search history.

(56) References Cited

U.S. PATENT DOCUMENTS

2013/0026591 A1* 1/2013 Iwafuchi ........... H01L 27/14618
257/432
2019/0126848 A1* 5/2019 Yoshida ............... H04N 5/2252

FOREIGN PATENT DOCUMENTS

JP 2010-219713 A 9/2010

* cited by examiner

*Primary Examiner* — Xi Wang
(74) *Attorney, Agent, or Firm* — Studebaker & Brackett PC

(57) ABSTRACT

Provided is an imaging apparatus having: an imaging optical system including at least one optical element; an image sensor configured to capture an object image formed by the imaging optical system; a substrate on which an image sensor is mounted; a holding member configured to hold the imaging optical system, the holding member including a substrate bonding face that is bonded to the substrate; a first bonding member configured to bond at least a part of a first face of the substrate, that faces the substrate bonding face, to the substrate bonding face; and a second bonding member configured to bond at least a part of a second face of the substrate, that is opposite to the first face of the substrate, to the substrate bonding face.

20 Claims, 9 Drawing Sheets

IMAGING APPARATUS, IMAGING APPARATUS MANUFACTURING METHOD AND MOVING BODY

CROSS-REFERENCE TO RELATED APPLICATION

The present application claims priority to and the benefit of Japanese Patent Application No. 2017-187198 filed on Sep. 27, 2017, the entire contents of which are incorporated herein by reference.

TECHNICAL FIELD

This disclosure relates to an imaging apparatus, an imaging apparatus manufacturing method and a moving body.

BACKGROUND

There is known a configuration in which a housing in which a lens is mounted and a substrate on which an image sensor is mounted are bonded with an adhesive (see, for example, Patent Literature (PTL) 1).

CITATION LIST

Patent Literature

PLT 1: JP2010219713A

SUMMARY

An imaging apparatus according to an embodiment of this disclosure has an imaging optical system including at least one optical element and an image sensor configured to capture an image of an object formed by the imaging optical system. The imaging apparatus has a substrate on which the image sensor is mounted and a holding member configured to hold the imaging optical system, the holding member including a substrate bonding face that is bonded to the substrate. The imaging apparatus has a first bonding member configured to bond at least a part of a first face of the substrate, that faces the substrate bonding face, to the substrate bonding face. The imaging apparatus has a second bonding member configured to bond at least a part of a second face of the substrate, that is opposite to the first face of the substrate, to the substrate bonding face.

An imaging apparatus manufacturing method according to an embodiment of this disclosure includes applying a first bonding member between a substrate bonding face of a holding member and at least a part of a first face of a substrate, on which an image sensor is mounted; curing the first bonding member. The holding member holds an imaging optical system that includes at least one optical element. The image sensor captures an image of an object formed by the imaging optical system. The imaging apparatus manufacturing method includes applying a second bonding member across at least a part of a second face of the substrate, that is the opposite to the first face of the substrate, and the substrate bonding face; and curing the second bonding member.

A moving body according to an embodiment of this disclosure is equipped with an imaging apparatus. The imaging apparatus has an imaging optical system including at least one optical element and an image sensor configured to capture an object image formed by the imaging optical system. The imaging apparatus has a substrate on which the image sensor is mounted and a holding member configured to hold the imaging optical system, the holding member including a substrate bonding face that is bonded to the substrate. The imaging apparatus has a first bonding member configured to bond at least a part of a first face of the substrate, that faces the substrate bonding face, to the substrate bonding face. The imaging apparatus has a second bonding member configured to bond at least a part of a second face of the substrate, that is opposite to the first face of the substrate, to the substrate bonding face.

BRIEF DESCRIPTION OF THE DRAWINGS

In the accompanying drawings.

BRIEF DESCRIPTION OF THE DRAWINGS

Figure 1:
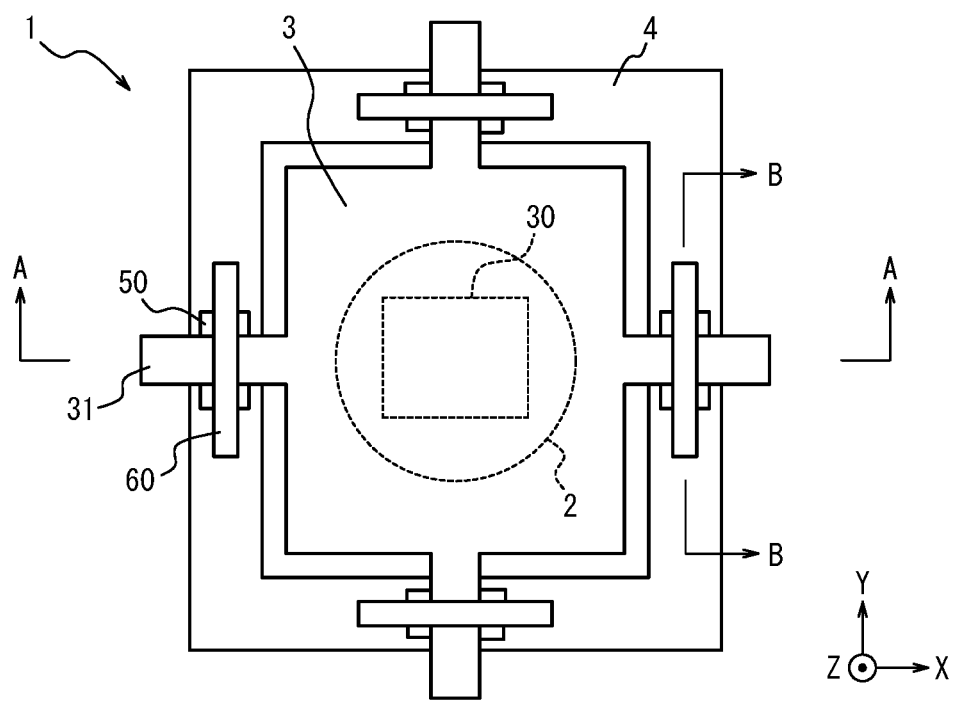
FIG. 1 is a plane view illustrating a configuration example of an imaging apparatus according to an embodiment.
Figure 2:
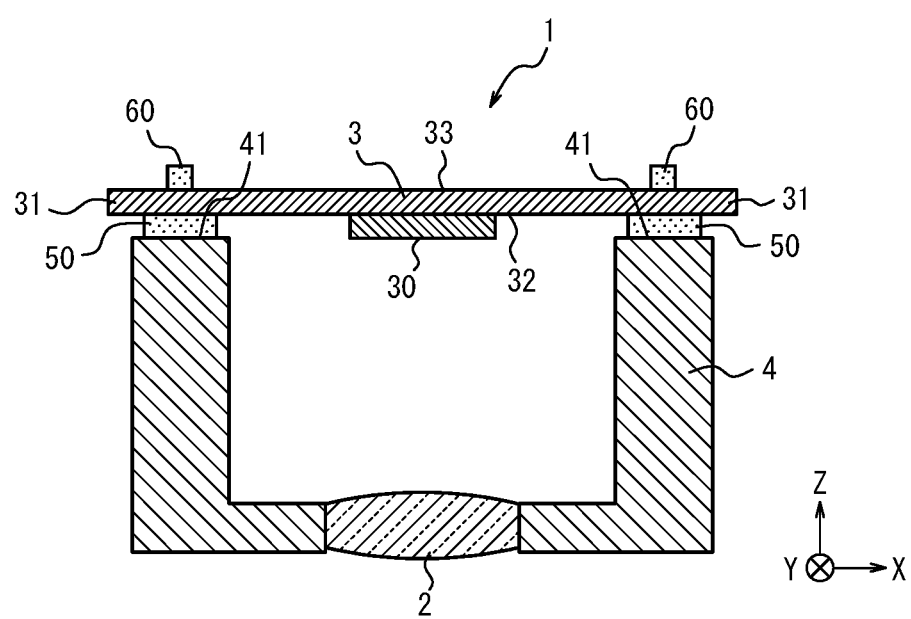
FIG. 2 is a cross-sectional view along A-A in FIG. 1.
Figure 3:
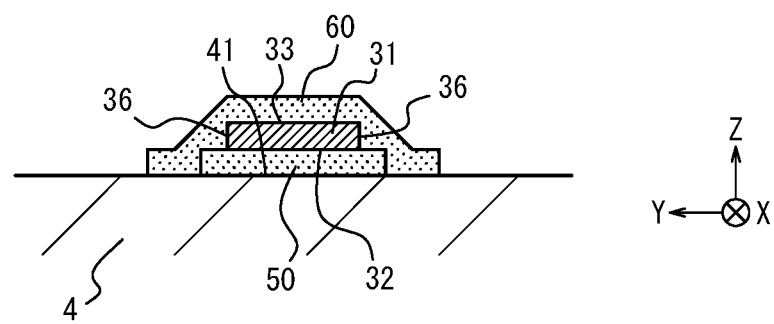
FIG. 3 is a cross-sectional view along B-B in FIG. 1.

As illustrated in FIGS. 1 to 3, an imaging apparatus 1 according to an embodiment has an imaging optical system 2, a substrate 3 on which an image sensor 30 is mounted and a holding member 4 configured to hold the imaging optical system 2. The substrate 3 is located on a positive direction side of the Z-axis with respect to the imaging optical system 2. The substrate 3 may have a first face 32 located on the side facing the imaging optical system 2 and a second face 33 located on the opposite side of the first face 32 with respect to the substrate 3. The image sensor 30 is mounted on the first face 32 of the substrate 3 and faces the imaging optical system 2. The substrate 3 may have bonding portions 31. Each bonding portion 31 may protrude from the substrate 3. Each bonding portion 31 protruding from the substrate 3 is also referred to as a protrusion. The bonding portions 31 may not protrude from the substrate 3. The substrate 3 may, at the bonding portions 31, be bonded to the holding member 4 by the first bonding members 50 and the second bonding members 60.

The imaging optical system 2 forms an object image entered to the imaging apparatus 1 on an image-capturing plane of the image sensor 30. The imaging optical system 2 may include a lens. The number of lenses is not limited to one, and may be two or more. At least a part of the lens may be replaced with other elements such as a mirror and the like. Other elements such as a lens, a mirror and the like are collectively referred to as an optical element. In other words, the imaging optical system 2 includes at least one optical element. The imaging optical system 2 is held by the holding member 4. The imaging optical system 2 may be bonded to the holding member 4 by resin such as adhesive, for example. The imaging optical system 2 may be connected to the holding member 4 by a fitting structure. The imaging optical system 2 may be connected to the holding member 4 by being tightened with screws and the like.

The image sensor 30 captures an image of an object formed on the image-capturing plane by the imaging optical system 2. The image sensor 30 may be Complementary Metal Oxide Semiconductor (CMOS) image sensor, Charge Coupled Device (CCD) and the like.

Not only the image sensor 30 but also a circuit that processes data of images captured by the image sensor 30 may be mounted on the substrate 3. The substrate 3 may be formed of a print circuit substrate and the like.

The holding member 4 holds the imaging optical system 2. The holding member 4 may have substrate bonding faces 41. Each substrate bonding face 41 faces a positive direction of the Z-axis. That is, the substrate bonding face 41 faces in a direction from the imaging optical system 2 to the image sensor 30. The substrate 3 may, on the substrate bonding faces 41, be bonded to the holding member 4. The substrate 3 may be bonded to the substrate bonding faces 41 such that an optical axis of the imaging optical system 2 aligns with the center of the image-capturing plane of the image sensor 30. The optical axis of the imaging optical system 2 may be aligned with the center of the image-capturing plane of the image sensor 30 by displacing the substrate 3 in the X axis direction or the Y axis direction. The substrate 3 may be bonded to the substrate bonding faces 41 such that the focus of the imaging optical system 2 is located on the image-capturing plane of the image sensor 30. The focus of the imaging optical system 2 and the image-capturing plane may be aligned by displacing the substrate 3 in the Z-axis direction. The substrate 3 may be bonded to the substrate bonding faces 41 such that the optical axis of the imaging optical system 2 is orthogonal to the image-capturing plane of the image sensor 30. An angle between the optical axis of the imaging optical system 2 and the image-capturing plane may be adjusted by displacing the bonding portions 31 of the substrate 3 in the Z-axis direction by distances different from each other. The holding member 4 may include a material such as resin, for example. The material of the holding member 4 is not limited to resin, and the holding member 4 may include various materials.

The first bonding members 50 are ultraviolet cured adhesives. The second bonding members 60 are thermosetting adhesives. The first bonding members 50 are not limited to ultraviolet cured adhesives, and may be adhesives that cure in less time than the second bonding members 60. The second bonding members 60 are not limited to thermosetting adhesives, and may be adhesives that have an adhesive strength higher than that of the first bonding members 50.

The substrate 3 may be bonded to the holding member 4 by the first bonding members 50 with aligned with the holding member 4. The substrate 3 and the holding member 4 may be aligned with each other before or after the first bonding members 50 are applied. The substrate 3 and the holding member 4 can be bonded to each other by curing the applied first bonding members 50. The bonding by the first bonding members 50 when the substrate 3 is aligned with the holding member 4 is also referred to as a temporary bonding. The bonding strength by the first bonding members 50 is weaker than that by the second bonding members 60. The substrate 3 may be bonded further by the second bonding members 60 when it is temporarily bonded to the holding member 4. Bonding by the second bonding members 60 is also referred to as a final bonding.

Alignment between the substrate 3 and the holding member 4 may be performed by an alignment apparatus. The substrate 3 and the holding member 4 may be aligned with each other while they are held by an alignment apparatus. The substrate 3 and the holding member 4 may be temporarily bonded to each other while they are aligned with each other by an alignment apparatus. When the substrate 3 and the holding member 4 are temporarily bonded to each other, an alignment state can be maintained even if they are removed from the alignment apparatus. Temporary bonding can be finished in less time than the final bonding. When a temporary bonding is performed, the time during which the substrate 3 and the holding member 4 are held by the alignment apparatus is reduced. That is, a takt time of the alignment apparatus can be reduced. Reduction in the takt time may reduce the number of alignment apparatuses. As a result, a manufacturing cost of the imaging apparatus 1 can be reduced. Moreover, when a final bonding is performed after a temporary bonding, the reliability of the imaging apparatus 1 can be improved. Use of a variety of kinds of bonding members may achieve both reduction in cost for the alignment step of the substrate 3 and the holding member 4 and improvement in reliability of the imaging apparatus 1.

The adhesive can shrink at a predetermined shrinkage ratio when cured. The first bonding members 50 may have a shrinkage ratio smaller than that of the second bonding members 60. When the shrinkage ratio of the first bonding members 50 is small when cured, even after the substrate 3 and the holding member 4 are temporarily bonded, a positional relationship between the substrate 3 and the holding member 4 is less likely to be changed from the state where they are aligned with each other by the alignment apparatus. That is, a temporary bonding with an adhesive having a small shrinkage ratio when cured can improve a positional accuracy between the substrate 3 and the holding member 4.

The first bonding members 50 are applied between the first face 32 of the bonding portions 31 and the substrate bonding faces 41, and the first face 32 of the bonding portions 31 and the substrate bonding faces 41 may be bonded to each other by curing the first bonding members 50. The cured first bonding members 50 may each be located between the first face 32 of each bonding portion 31 and each substrate bonding face 41. When each first bonding member 50 is located between the first face 32 of each bonding portion 31 and each substrate bonding face 41, each bonding portion 31 can be prevented from being displaced in the negative direction of the Z-axis with respect to each substrate bonding face 41. That is, the first bonding members 50 can prevent the substrate 3 and the holding member 4 from being displaced in the direction that they come close to each other. The cured first bonding members 50 may be clamped between the first face 32 of the bonding portions 31 and the substrate bonding faces 41. When the first bonding members 50 are clamped between the bonding portions 31 and the substrate bonding faces 41, the bonding portions 31 can be more easily prevented from being displaced in the negative direction of the Z-axis with respect to the substrate bonding faces 41.

When the first bonding members 50 are located between the substrate 3 and the holding member 4, the position of the substrate 3 in the Z-axis direction with respect to the holding member 4 can be fixed. That is, the position of the substrate 3 in the Z-axis direction with respect to the holding member 4 can be adjusted by the thickness of each first bonding member 50 in the Z-axis direction.

As a comparative example, when a spacer is located between the substrate 3 and the holding member 4, the position of the substrate 3 in the Z-axis direction with respect to the holding member 4 can be adjusted. In the comparative example, the thickness of the spacer can be a discrete value, rather than a continuous value. When the thickness of the spacer is a discrete value, the position of the substrate 3 in the Z-axis direction with respect to the holding member 4 can be set in a discrete manner. On the other hand, in this embodiment, the thickness of each first bonding member 50 can be adjusted by a continuous value. In this manner, the position of the substrate 3 in the Z-axis direction with respect to the holding member 4 can be determined in a relatively free manner.

In the comparative example, the accuracy of the position of the substrate 3 in the Z-axis direction with respect to the holding member 4 can depend on the accuracy of the thickness of the spacer and the like. On the other hand, in this embodiment, the thickness of each first bonding member 50 can be determined with the substrate 3 aligned with the holding member 4 in the Z-axis direction. In this manner, the accuracy of the position of the substrate 3 in the Z-axis direction with respect to the holding member 4 is less likely to depend on the dimensional accuracy of a member. As a result, the accuracy of the position of the substrate 3 in the Z-axis direction with respect to the holding member 4 can be improved.

Figure 4:
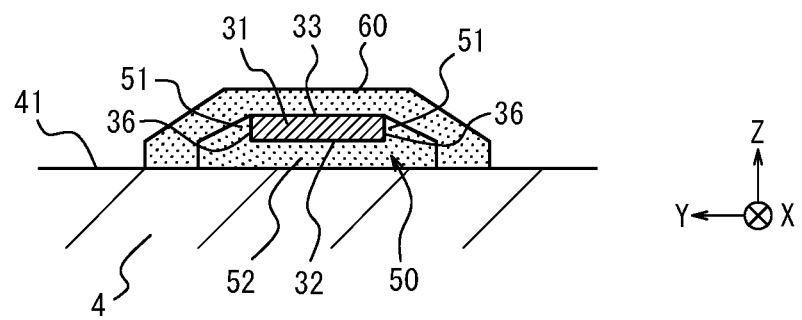
FIG. 4 is a cross-sectional view illustrating an example of a cross-sectional shape of a first bonding member.

As illustrated in FIG. 4, the first bonding member 50 may have side portions 51 located on the positive direction side and the negative direction side of the Y-axis of the bonding portion 31 and a base portion 52 located on the side of the first face 32. The side portions 51 can prevent the bonding portion 31 from displacing in the Y-axis direction. The bottom portion 52 can prevent the bonding portion 31 from displacing in the negative direction of the Z-axis.

Figure 5:
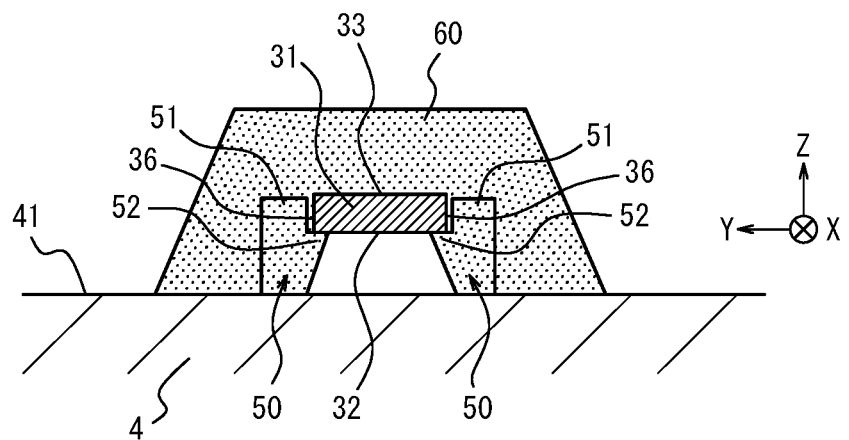
FIG. 5 is a cross-sectional view illustrating an example of a cross-sectional shape of the first bonding member.

As illustrated in FIGS. 3 and 4, the first bonding member 50 may be filled such that no space remains between the first face 32 of the bonding portion 31 and the substrate bonding face 41, or as illustrated in FIG. 5, the first bonding member 50 may be applied such that a space remains therebetween. In the example illustrated in FIG. 5, bottom portions 52 of the first bonding members 50 may each protrudes from each side portion 51 toward the first face 32 of the bonding portion 31 and come in contact with a part of the first face 32 of the bonding portion 31. The bottom portions 52 may prevent the bonding portion 31 from displacing in the negative direction of the Z-axis by coming in contact with at least a part of the first face 32 of the bonding portion 31. When the bottom portions 52 come in contact with at least a part of the first face 32 of the bonding portion 31, it can be said that the first bonding members 50 are located between the first face 32 of the bonding portion 31 and the substrate bonding face 41.

As illustrated in FIGS. 3 to 5, the second bonding member 60 may be applied from the second face 33 of the bonding portion 31 to the substrate bonding face 41. The second bonding member 60 can shrink when cured in a state where the second face 33 of the bonding portion 31 and the substrate bonding face 41 are bonded thereby. When the second bonding member 60 is shrunk, the second face 33 of the bonding portion 31 can be pulled by the substrate bonding face 41. That is, the cured second bonding member 60 can press the substrate 3 toward the holding member 4. In this manner, the substrate 3 can be more firmly bonded to the holding member 4 than in the case where it is bonded only by the first bonding members 50. When the cured first bonding members 50 are located between the first face 32 of the bonding portion 31 and the substrate bonding face 41, even if the bonding portion 31 is pressed in the negative direction of the Z-axis by the cured second bonding member 60, the bonding portion 31 is less likely to be displaced with respect to the substrate bonding face 41. That is, the substrate 3 and the holding member 4 are firmly bonded to each other and the positional relationship between the substrate 3 and the holding member 4 can be maintained accurately as well by the first bonding members 50 located between the substrate 3 and the holding member 4 and the second bonding members 60 configured to press the substrate 3 toward the holding member 4.

When the bonding portion 31 protrudes from the substrate 3 and forms a protrusion, even if a stress caused by the bonding member acts on the bonding portion 31 and distortion occurs, the influence of the distortion is less likely to reach a portion of the substrate 3 on which the image sensor 30 is mounted.

When the bonding portion 31 protrudes from the substrate 3 and forms a protrusion, the bonding portion 31 has edges 36 as illustrated in FIG. 3 to FIG. 5. In FIG. 3 to FIG. 5, the edges 36 can extend in the X-axis direction. Each first bonding member 50 may be located at least between each edge 36 of the bonding portion 31 and the substrate bonding face 41. In this manner, a force of the second bonding member 60 pressing each edge 36 of the bonding portion 31 toward the holding member 4 and a force of the first bonding member 50 supporting each edge 36 of the bonding portion 31 can be balanced. As a result, even if the first bonding members 50 and the second bonding members 60 are used together, the bonding portion 31 and the substrate 3 connecting thereto are less likely to be deformed. Each first bonding member 50 may be located all over the edge 36 of the bonding portion 31 or located at a part thereof.

In the examples illustrated in FIGS. 3 to 5, although each edge 36 of the bonding portion 31 is formed with a face along the Z-axis, it is not limited thereto, and it may be formed in a shape having a face that intersects the Z-axis such as a bellows shape or a screw thread shape and the like, for example. That is, each edge 36 may have a face that faces the side of the substrate bonding face 41. Each first bonding member 50 may come in contact with each edge 36. Compared with the case where each edge 36 is formed by a face along the Z-axis, when each edge 36 has a face that faces the side of the substrate bonding face 41, it is easily prevented, by each first bonding member 50, from being displaced in the negative direction of the Z-axis. Further, when each edge 36 has a face that faces the side of the substrate bonding face 41, it can be said that at least a part of each first bonding member 50 is located between the substrate 3 and the substrate bonding face 41.

The second bonding member 60 may not be located between the bonding portion 31 and the substrate bonding face 41. That is, when viewing the substrate bonding face 41 from the side of the substrate 3, the second bonding member 60 may be bonded to the position on the substrate bonding face 41 that does not overlap with the bonding portion 31. If the second bonding member 60 is located between the bonding portion 31 and the substrate bonding face 41, the second bonding member 60 having a relatively high shrinkage ratio when cured can pull the bonding portion 31 toward the substrate bonding face 41 with a force larger than that of the first bonding member 50. In this case, the bonding portion 31 and the substrate 3 connected to the bonding portion 31 are easily distorted. When viewing the substrate bonding face 41 from the side of the substrate 3, if the second bonding member 60 is bonded to the position on the substrate bonding face 41 that does not overlap with the bonding portion 31, the bonding portion 31 and the substrate 3 connected to the bonding portion 31 are less likely to be distorted.

The second bonding member 60 may be bonded to the substrate bonding face 41 at least two portions where a protrusion is clamped therebetween. As illustrated in FIG. 3, the second bonding member 60 may be bonded to the substrate bonding face 41 on the Y-axis positive direction side and the Y-axis negative direction side with respect to the bonding portion 31, which extends in the X-axis direction and forms a protrusion. In this case, the bonding portion 31, which forms a protrusion, is pulled by the second bonding member 60 from the Y-axis positive direction side and the Y-axis negative direction side. When the protrusion is pulled from both sides, a force in the direction intersecting with the direction from the substrate 3 to the holding member 4 is cancelled. As a result, compared with the case where the protrusion is pulled from one side, the substrate 3 is less likely to be distorted. As illustrated in FIGS. 3 to 5, the height of each side portion 51 of the first bonding member 50 may be the same as that of the second face 33 of the bonding portion 31 or lower than that of the second face 33 of the bonding portion 31. The height of the side portion 51 and the height of the second face 33 of the bonding portion 31 are represented by a distance from the substrate bonding face 41. When the height of the side portion 51 is the same as or lower than that of the second face 33 of the bonding portion 31, a shrinkage of the second bonding member 60 when cured allows the second face 33 of the bonding portion 31 to be less likely to be pulled in the positive direction of the Z-axis.

As a comparative example, when the substrate 3 and the holding member 4 are bonded to each other by the first bonding members 50 only, a relatively low bonding strength of the first bonding members 50 can reduce the reliability of the imaging apparatus 1. As another comparative example, when the substrate 3 and the holding member 4 are bonded to each other by the second bonding members 60 only, a relatively high shrinkage ratio of the second bonding member 60 when cured can reduce the alignment accuracy between the substrate 3 and the holding member 4. On the other hand, in the imaging apparatus 1 according to this embodiment, when the first bonding members 50 and the second bonding members 60 are used together, the substrate 3 and the holding member 4 are firmly bonded to each other and a high alignment accuracy can be maintained between the substrate 3 and the holding member 4. When the substrate 3 is rectangular, the substrate 3 can be held with balance if the bonding portion 31 is positioned on each side of the substrate 3. When viewed from the second face 33 of the substrate 3, a gap can exist between the substrate bonding face 41 of the holding member 4 and the substrate 3. The gap between the substrate bonding face 41 and the substrate 3 can act as a heat release opening of the substrate 3.

Figure 6:
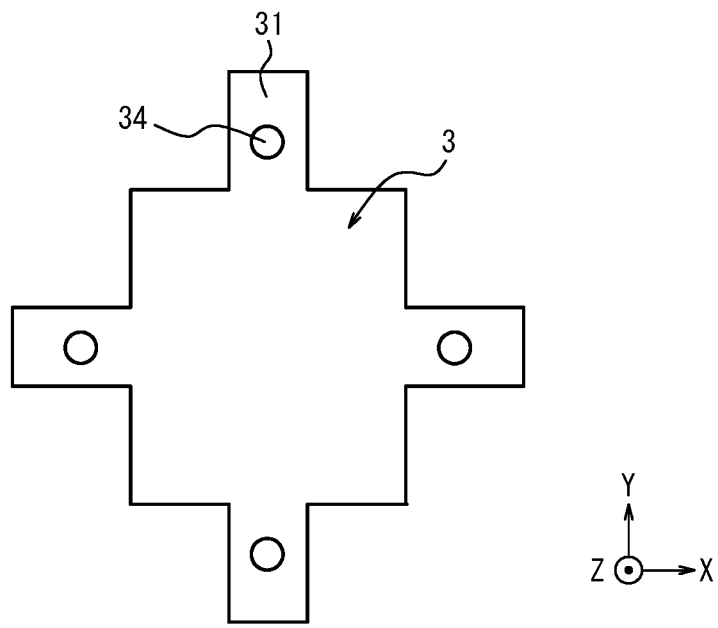
FIG. 6 is a plane view illustrating an example of a substrate having bonding holes.
Figure 7:
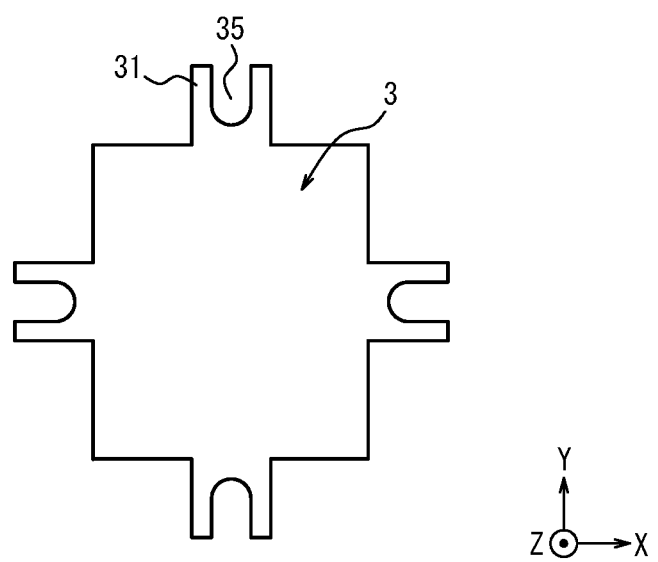
FIG. 7 is a plane view illustrating an example of a substrate having notches.

As illustrated in FIG. 6, the substrate 3 may have a bonding hole 34 in each bonding portion 31. The shape of the bonding hole 34 when viewed from the side of the first face 32 or the second face 33 is not limited to a circle, and may have various shapes such as an oval or polygonal shape. As illustrated in FIG. 7, the substrate 3 may have a notch 35 in each bonding portion 31. The shape of the notch 35 when viewed from the side of the first face 32 or the second face 33 is not limited to that illustrated in FIG. 7, and may have various shapes. The substrate 3 may have at least one of the bonding hole 34 and the notch 35. At least one of the bonding hole 34 and the notch 35 may be located in a protruded bonding portion 31 or in a not-protruded bonding portion 31.

Figure 8:
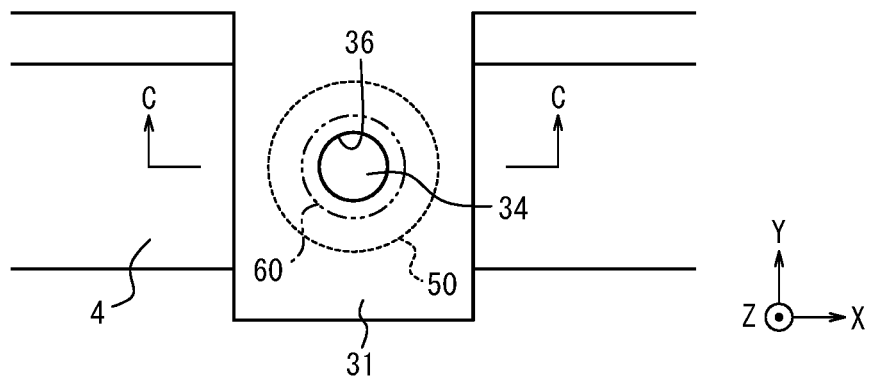
FIG. 8 is a plane view of an enlarged configuration around the bonding holes.
Figure 9:
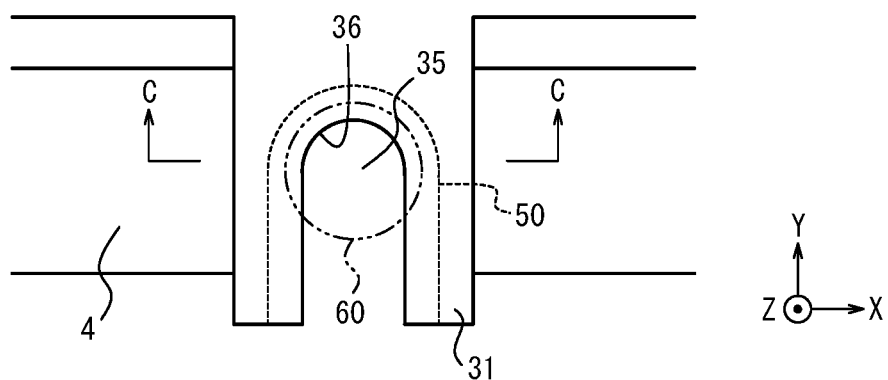
FIG. 9 is a plane view of an enlarged configuration around the notches.
Figure 10:
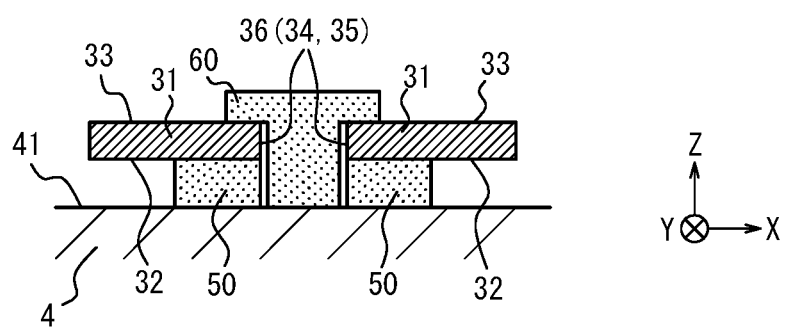
FIG. 10 is a cross-sectional view along C-C common to FIGS. 8 and 9.

FIG. 8 illustrates an enlarged view of the bonding hole 34 illustrated in FIG. 6. The bonding hole 34 can be defined as a portion surrounded by the edge 36. FIG. 9 is an enlarged view of the notch 3 illustrated in FIG. 7. The notch 35 can be defined as a portion surrounded by the edge 36. FIG. 10 is a cross-sectional view along C-C common to FIGS. 8 and 9.

On the side of each first face 32 of bonding portion 31, each first bonding member 50 may be applied along the edge 36 of the bonding hole 34 or the notch 35. The first bonding member 50 may be applied in an annular manner along the edge 36 of the bonding hole 34. The first bonding member 50 may be applied in U-form along the edge 36 of the notch 35. In this manner, as the same as or similar to the examples each illustrated in FIGS. 3 to 5, the first bonding member 50 can prevent the substrate 3 and the holding member 4 from being displaced in the direction that they come close to each other. The first bonding member 50 may be applied continuously or discretely along the edge 36 of the bonding hole 34 or the notch 35. When the first bonding member 50 is applied discretely, each distance between the portions where the bonding member is applied may be equal to each other. The position where the second bonding member 60 is applied may be included inside the figure in which the position where the first bonding member 50 is applied is the outer periphery, inside the figure in which the position where the first bonding member 50 is applied is a vertex, or inside the figure similar to the above described ones. The position where the second bonding member 60 is applied may be brought close to the center of gravity of the figure in which the position where the first bonding member 50 is applied is an outer periphery, the center of gravity of the figure in which the position where the first bonding member 50 is applied is a vertex, or the center of gravity of the figure similar to the above described ones.

The second bonding member 60 may be injected into the bonding hole 34 or the notch 35. The second bonding member 60 may be applied through the bonding hole 34 or the notch 35 from the face on the side of the second face 33 of the bonding portion 31 located around the edge 36 to the substrate bonding face 41 of the holding member 4. The second bonding member 60 applied in this manner cures, and thus bonds to around the edge 36 of the second face 33 of the substrate 3, and to the substrate bonding face 41 located inside the edge 36, when viewed from the side of the substrate 3. When the substrate 3 is bonded by the second bonding member 60 in this manner, the second bonding member 60 can bond the substrate 3 to the holding member 4 more firmly, as the same as or similar to the examples each illustrated in FIGS. 3 to 5. In FIGS. 8 and 9 that illustrate the bonding hole 34 and the notch 35, respectively, the second bonding member 60 is indicated by a two-dot dashed virtual line. In the examples each illustrated in FIGS. 8 to 10, when the second bonding member 60 is injected into the bonding hole 34 or the notch 35, the moving amount of a nozzle that applies the second bonding member 60 can be reduced. As a result, a takt time of the work of applying a bonding member can be reduced.

When the second bonding member 60 passes through the bonding hole 34 or the notch 35, the first bonding member 50 may surround the second bonding member 60. In this manner, a force applied from the second bonding member 60 to the edge 36 of the bonding hole 34 or of the notch 35 is absorbed by the first bonding member 50, which allows the substrate 3 to be less likely to be distorted.

When the second bonding member 60 passes through the bonding hole 34 or the notch 35, first bonding members 50 may be located, with respect to the second bonding member 60, on the side close to the position of the substrate 3 on which the image sensor 30 is mounted, and on the side distant from the position of the substrate 3 on which the image sensor 30 is mounted, respectively. If the first bonding members 50 are located on either the close side or the distant side, the position of the second bonding member 60 is a point where a pressure is applied onto the substrate 3, and the position of the first bonding members 50 is a fulcrum, and as a result the substrate 3 can be distorted. In other words, a portion of the substrate 3 on which the image sensor 30 is mounted can be displaced. As a result, alignment accuracy between the imaging optical system 2 and the image sensor 30 can be reduced. When the first bonding members 50 are located, with respect to the second bonding member 60, on the side close to the image sensor 30 and on the side distant therefrom, respectively, a point where a pressure is applied is sandwiched between fulcrums. In this case, the pressure can be absorbed by fulcrums on both sides. In other words, a force applied from the second bonding member 60 to the substrate 3 is absorbed by the first bonding members 50, and is less likely to reach the portion of the substrate 3 on which the image sensor 30 is mounted. As a result, the substrate 3 is less likely to be distorted.

First bonding member s50 may be located on the side close to the position of the substrate 3 on which the image sensor 30 is mounted and the side distant from the position of the substrate 3 on which the image sensor 30 is mounted, respectively, with respect to the second bonding member 60, along the line connecting the center of the image-capturing plane of the image sensor 30 and the center of the second bonding member 60.

The positional relationship between the first bonding member 50 and the second bonding member 60 may be specified by an orthographic projection of each of them onto a projection plane. The projection plane is a plane orthogonal to the first face 32 of the substrate 3, and includes a line connecting between the center of the image-capturing plane of the image sensor 30 and the center of the second bonding member 60. For example, in FIG. 8, the image sensor 30 is located in the positive direction of the Y-axis when viewed from the bonding hole 34. In this case, the projection plane is defined as a plane that is parallel to the YZ plane and passes through the center of the second bonding member 60.

Figure 11:
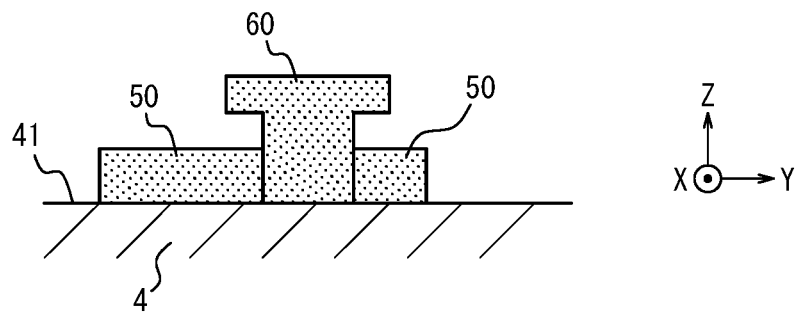
FIG. 11 is a diagram illustrating an example of an orthographic projection of a bonding member with respect to a projection plane.

As illustrated in FIG. 11, the orthographic projection of the first bonding member 50 onto the projection plane may be located on the side in the positive direction of the Y-axis and on the side in the negative direction of the Y-axis with respect to the orthographic projection of the second bonding member 60. In other words, the orthographic projection of the first bonding member 50 may be located on both of the side close to the image sensor 30 and the side distant from the image sensor 30 with respect to the orthographic projection of the second bonding member 60. In this case, a force applied from the second bonding member 60 to the substrate 3 is also absorbed by the first bonding member 50, and is less likely to reach a portion of the substrate 3 on which the image sensor 30 is mounted. As a result the substrate 3 is less likely to be distorted.

When bonding portions 31 protrude from the substrate 3, the first bonding members 50 may be located on the side close to the substrate 3 and on the side distant from the substrate 3, respectively, with respect to the second bonding member 60, along the direction in which the bonding portions 31 protrude. In this case, a force applied from the second bonding member 60 to the bonding portion 31 is also absorbed by the first bonding member 50, and is less likely to reach the substrate 3. As a result the substrate 3 is less likely to be distorted.

Figure 12:
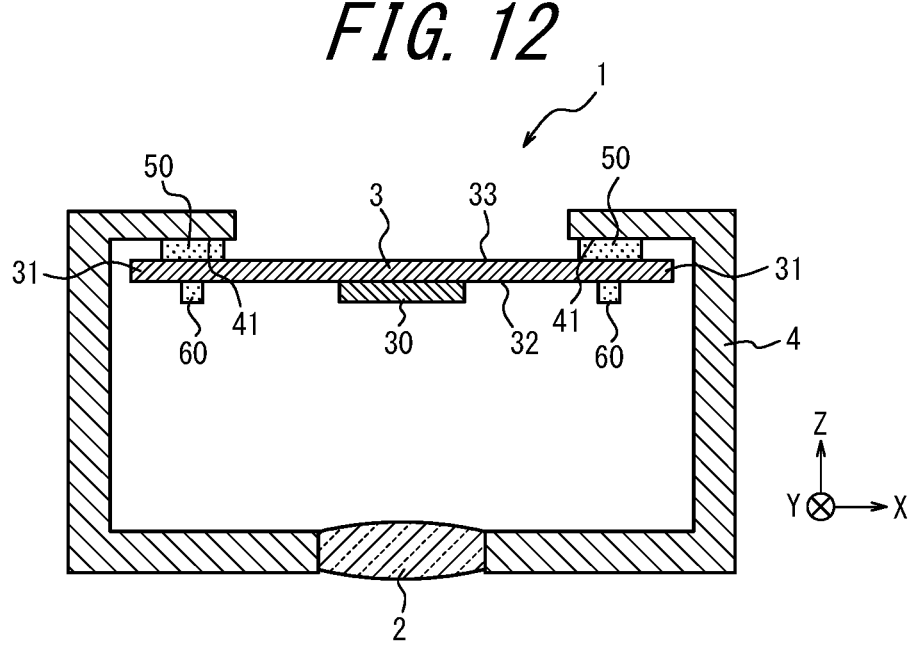
FIG. 12 is a cross-sectional view illustrating a configuration example of an imaging apparatus according to an embodiment.
Figure 13:
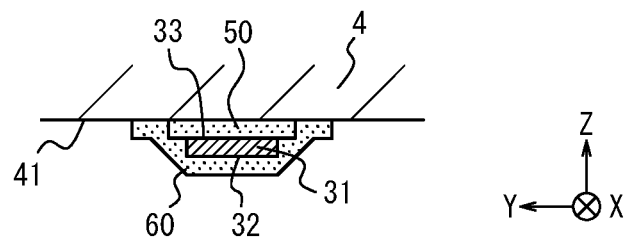
FIG. 13 is a cross-sectional view illustrating a configuration example of the imaging apparatus according to an embodiment.

As illustrated in FIGS. 12 and 13, the substrate bonding face 41 of the holding member 4 may face in the negative direction of the Z-axis, which is opposite the direction in the examples each illustrated in FIGS. 2 and 3. That is, the substrate bonding face 41 may face in the direction from the image sensor 30 to the imaging optical system 2. In this case, the substrate bonding face 41 faces the second face 33 of the substrate 3. The first bonding member 50 may be located between the side of the second face 33 of the bonding portion 31 and the substrate bonding face 41. The second bonding member 60 may be applied from the first face 32 of the bonding portion 31 to the substrate bonding face 41. In this manner, as with the examples each illustrated in FIGS. 3 to 5, the substrate 3 and the holding member 4 are firmly bonded to each other and the accuracy of the positional relationship between the substrate 3 and the holding member 4 can be highly maintained.

In the imaging apparatus 1 according to this embodiment, the first bonding member 50 bonds between the substrate bonding face 41 of the holding member 4 and a face of the first face 32 and the second face 33 of the substrate 3 that faces the substrate bonding face 41. The second bonding member 60 bonds between a face of the first face 32 and the second face 33 of the substrate 3 located on the opposite side of the substrate when viewed from the substrate bonding face 41 and the substrate bonding face 41. In this manner, the substrate 3 and the holding member 4 are firmly bonded to each other and the accuracy of the positional relationship between the substrate 3 and the holding member 4 can be highly maintained.

Figure 14:
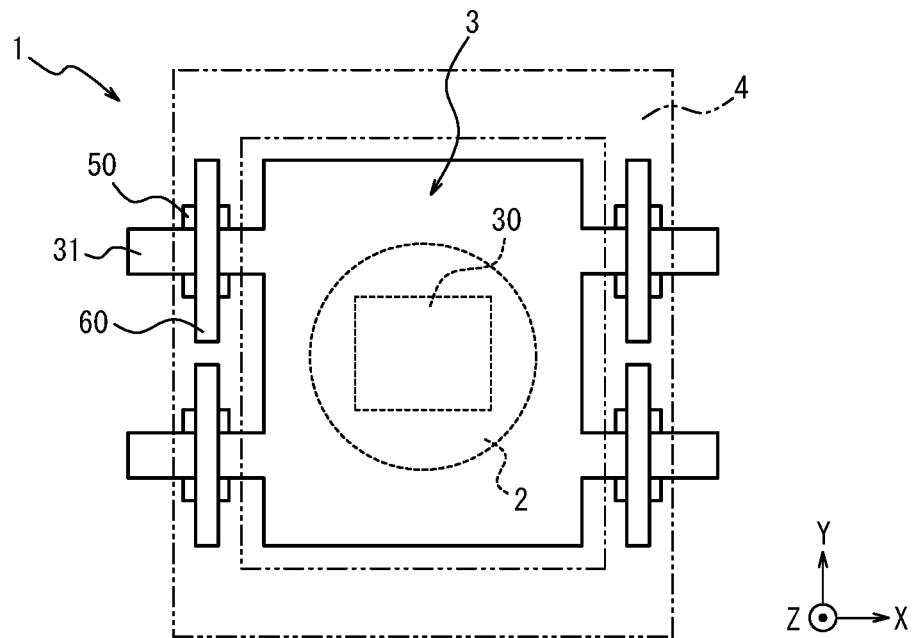
FIG. 14 is a plane view illustrating a configuration example of a substrate.

As illustrated in FIG. 14, the bonding portion 31 may be located along a set of sides of the substrate 3 opposite to each other. In this case, the first bonding member 50 and the second bonding member 60 can be applied in one direction. In this manner, a takt time of applying the bonding member can be reduced. As a result, reduction in the manufacturing cost or improvement of productivity can be achieved. The number of bonding portions 31 is not limited to two per each side of the substrate 3, and may be one or three or more. Each bonding portion 31 that protrudes from the substrate 3 may be located near the corner of the substrate 3. When the substrate 3 has a polygonal shape, the bonding portion 31 may be located near the vertex of the substrate 3. In this manner, the substrate 3 can be held more stably.

Figure 15:
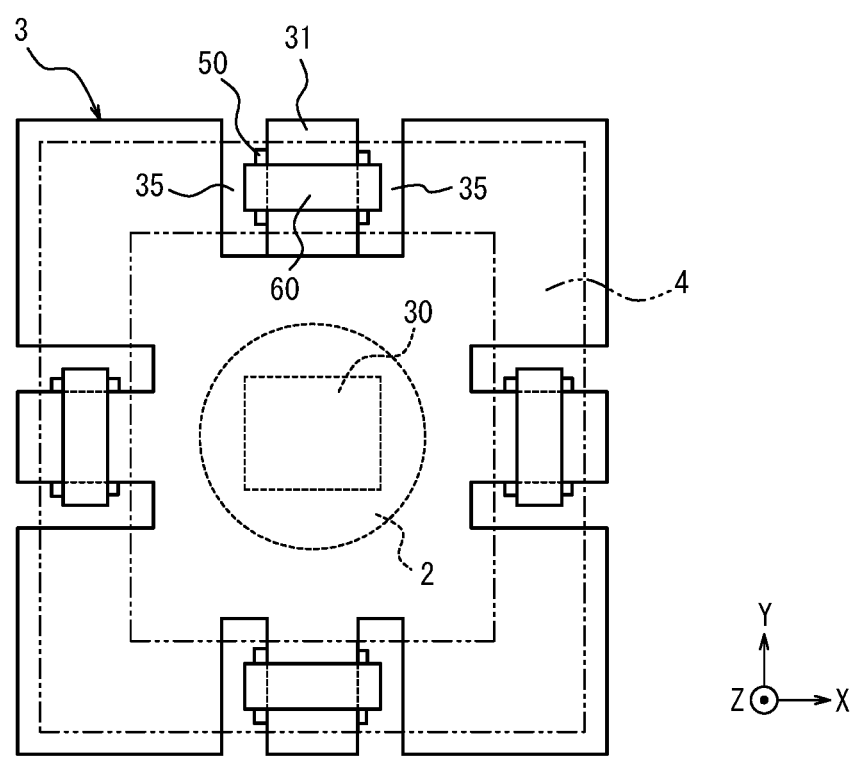
FIG. 15 is a plane view illustrating a configuration example of the substrate.

As illustrated in FIG. 15, the bonding portion 31 may protrude from the substrate 3 when it is located between two notches 35 provided in the substrate 3. In this manner, when compared with the example illustrated in FIG. 1, an area of the substrate 3 on which parts are mounted can be increased. The number of the bonding portions 31 is not limited to one per each side of the substrate 3, and may be two or more.

Figure 16:
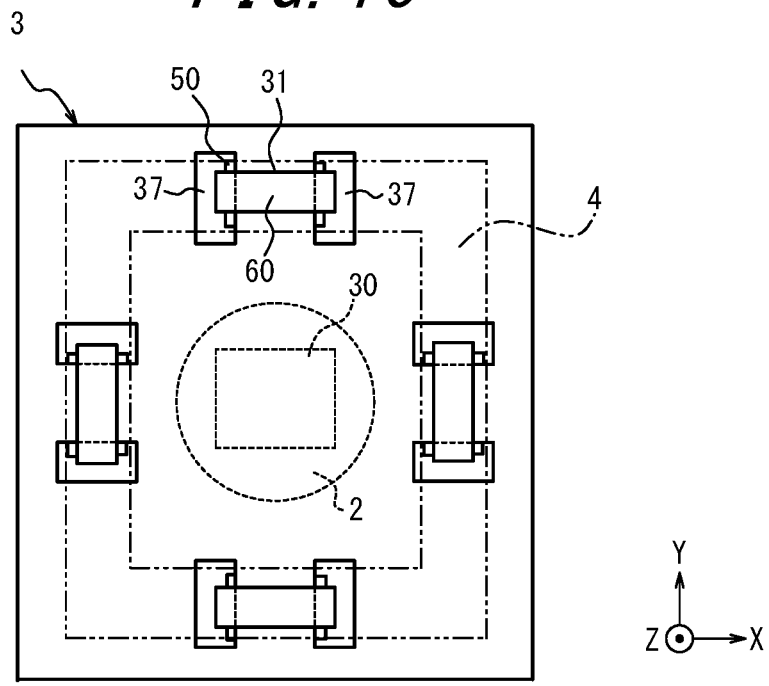
FIG. 16 is a plane view illustrating a configuration example of the substrate.

As illustrated in FIG. 16, the bonding portion 31 may be located between two openings 37 provided in the substrate 3. In this manner, as with the example illustrated in FIG. 15, the area of the substrate 3 on which parts are mounted can be increased. Compared with the example illustrated in FIG. 15, the number of connecting portions between the bonding portion 31 and the other portion of the substrate 3 can be increased. When the number of connecting portions is increased, a strength of the substrate 3 against an external force is increased and heat is easily released from the substrate 3 to the holding member 4 through the bonding portion 31. It can be said that the bonding portion 31 illustrated in FIG. 16 protrudes between the openings 37, thus is also referred to as a protrusion. The number of bonding portions 31 is not limited to one per each side of the substrate 3, and may be two or more.

Figure 17:
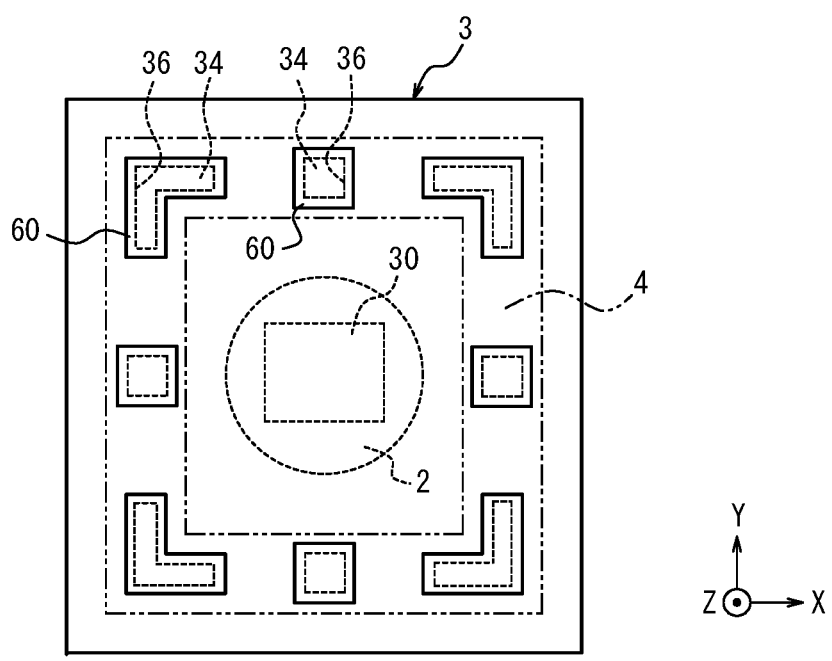
FIG. 17 is a plane view illustrating a configuration example of the substrate.

As illustrated in FIG. 17, the substrate 3 may have, instead of the protruding bonding portion 31, a bonding hole 34 surrounded by an edge 36. In this manner, compared with the example illustrated in FIG. 1, the area on the substrate 3 on which parts are mounted can be increased. The position where the bonding hole 34 is located is not limited to that illustrated in FIG. 17, and the bonding hole 34 may be located only on each side of the holding member 4, or only in each corner of the holding member 4. The bonding hole 34 may be replaced with the notch 35 surrounded by the edge 36. The number of the bonding holes 34 or the notches 35 is not limited to one per each side of the substrate 3, and may be two or more.

Figure 18:
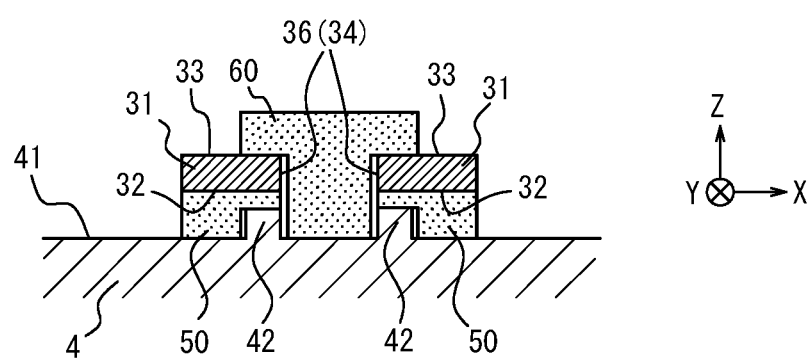
FIG. 18 is a cross-sectional view illustrating a configuration example of a holding member.

As illustrated in FIG. 18, when the substrate 3 has the bonding hole 34 surrounded by the edge 36, the holding member 4 may have ribs 42 protruding from the substrate bonding face 41 to the substrate 3. The ribs 42 may be located along the edge 36 of the bonding hole 34 of the substrate 3. The shape of the rib 42 when viewed from the side of the second face 33 of the substrate 3 may be the same or similar to that of the edge 36 of the bonding hole 34. For example, when the bonding hole 34 is circular, the rib 42 may be circular. The rib 42 may be located corresponding not only to the bonding hole 34 but also to the notch 35.

Each rib 42 may be located between the first bonding member 50 and the second bonding member 60. That is, each rib 42 may separate the first bonding member 50 and the second bonding member 60. In this manner, the first bonding member 50 and the second bonding member 60 are less likely to come in contact with each other. As a result, the first bonding member 50 and the second bonding member 60 are less likely to hinder from curing to each other.

When each rib 42 protrudes toward the substrate 3, the area of contact between the second bonding member 60 and the side of each rib 42 can be increased. In this manner, the strength of bonding between the second bonding member 60 and the holding member 4 can be increased. When each rib 42 protrudes toward the substrate 3, a distance between the rib 42 and the first face 32 of the substrate 3 can be reduced. In this manner, an amount of the bonding member to be applied between the substrate 3 and the substrate bonding face 41 can be reduced.

When the distance between the rib 42 and the first face 32 of the substrate 3 is reduced, the thickness of the first bonding member 50 can be reduced. In this case, the shrinkage amount of the first bonding member 50 applied between the rib 42 and the first face 32 of the substrate 3 can be reduced when cured. As a result, the accuracy of the distance between the rib 42 and the first face 32 of the substrate 3 can be improved.

Figure 19:
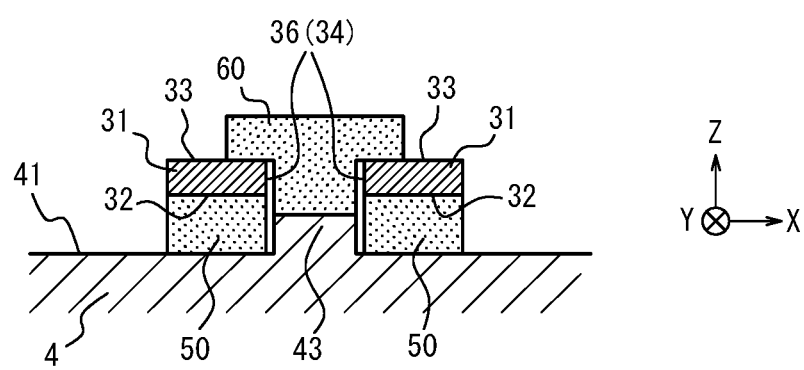
FIG. 19 is a cross-sectional view illustrating a configuration example of the holding member.

As illustrated in FIG. 19, the holding member 4 may have a boss 43 on the substrate bonding face 41. The boss 43 may be located inside the bonding hole 34 of the substrate 3 when viewed from the side of the second face 33 of the substrate 3. The shape of the boss 43 when viewed from the side of the second face 33 of the substrate 3 may be the same or similar to that of the bonding hole 34. For example, when the bonding hole 34 is circular, the boss 43 may be circular. The boss 43 may have a shape obtained by filling the inside of the rib 42 illustrated in FIG. 18.

Similar to the rib 42, the boss 43 may be located between the first bonding member 50 and the second bonding member 60. In this manner, the first bonding member 50 and the second bonding member 60 are less likely to come in contact with each other. As a result, the first bonding member 50 and the second bonding member 60 are less likely to hinder from curing to each other. When the boss 43 protrudes toward the substrate 3, the amount of the second bonding member 60 to be applied to the bonding hole 34 can be reduced.

Figure 20:
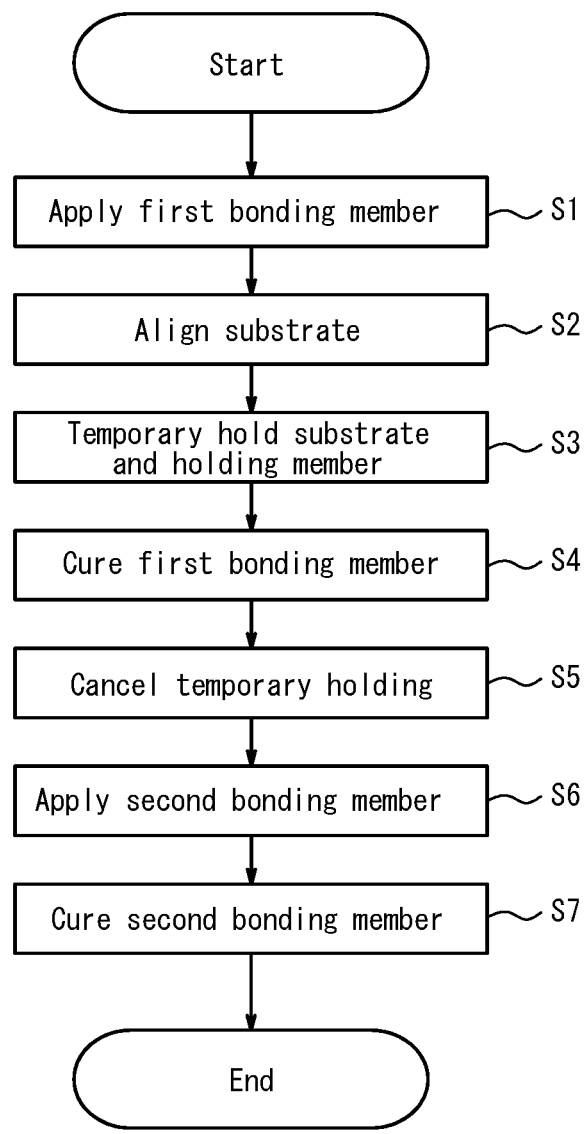
FIG. 20 is a flowchart illustrating an example of a procedure of an imaging apparatus manufacturing method according to an embodiment.

The imaging apparatus 1 can be assembled by performing the manufacturing method according to the procedure of the flowchart illustrated in FIG. 20.

The first bonding members 50 is applied to the substrate bonding face 41 of the holding member 4 (step S1). The first bonding members 50 may be applied such that it fills between the bonding portion 31 of the substrate 3 and the substrate bonding face 41 as illustrated in FIGS. 3 and 4, for example. The first bonding member 50 may be applied along the edge 36 of the bonding portion 31 of the substrate 3 as illustrated in FIG. 5, for example. The first bonding member 50 may be applied along the edge 36 of bonding hole 34 or the notch 35 of the substrate 3 as illustrated in FIGS. 8 and 9, for example.

The substrate 3 is disposed on the holding member 4 and is aligned with the holding member 4 (step S2). When the substrate bonding face 41 is oriented in the direction from the imaging optical system 2 to the image sensor 30, the first face 32 of the substrate 3 faces the substrate bonding face 41. When the substrate bonding face 41 is oriented in the direction from the image sensor 30 to the imaging optical system 2, the second face 33 of the substrate 3 faces the substrate bonding face 41. The position of the substrate 3 may be determined on the basis of the position of the imaging optical system 2. The position of the substrate 3 may be determined such that the position of the image-capturing plane of the image sensor 30 is aligned with the optical axis and the focal position of the imaging optical system 2. The substrate 3 and the holding member 4 may be held by an alignment apparatus. The position of the substrate 3 may be determined by a robot arm and the like of the alignment apparatus.

The substrate 3 and the holding member 4 are temporary held to each other (step S3). The temporary holding can maintain the positional relationship between the substrate 3 and the holding member 4 until they are bonded to each other. The substrate 3 may be provided with a clamp and the like and temporary held by the holding member 4 to the substrate 3. The substrate 3 may be temporary held by the holding member 4 while the position thereof is determined by a robot arm of the alignment apparatus, for example.

The first bonding member 50 is cured (step S4). When the first bonding member 50 is an ultraviolet cured adhesive, the first bonding member 50 is cured by irradiating the ultraviolet ray to the substrate 3 and the holding member 4 that are temporary held to each other. When the first bonding member 50 contains another material, a step of curing the material may be performed. When the first bonding member 50 is cured, the substrate 3 and the holding member 4 are temporary bonded to each other.

The temporary holding of the substrate 3 and the holding member 4 is released (step S5). Even if the temporary holding is released, the positional relationship between the substrate 3 and the holding member 4 that are temporary bonded to each other can be maintained.

The second bonding member 60 is applied (step S6). When the substrate bonding face 41 is oriented in the direction from the imaging optical system 2 to the image sensor 30, the second bonding member 60 may be applied across between the second face 33 of the substrate 3 and the substrate bonding face 41. When the substrate bonding face 41 is oriented in the direction from the image sensor 30 to the imaging optical system 2, the second bonding member 60 may be applied across between the first face 32 of the substrate 3 and the substrate bonding face 41. When the substrate 3 has protrusions, the second bonding member 60 may be applied across between each protrusion and the substrate bonding face 41 located on the side of each protrusion. When the substrate 3 has the bonding hole 34 or the notch 35, the second bonding member 60 may be applied to the inside of the bonding hole 34 or the notch 35.

The second bonding member 60 is cured (step S7). When the second bonding member 60 is a thermosetting adhesive, the second bonding member 60 is cured by applying heat to the imaging apparatus 1 to which the second bonding member 60 is applied. When the second bonding member 60 contains another material, a step of curing the material may be performed. After the step S7, a procedure of the flowchart illustrated in FIG. 20 ends.

In the procedure of the flowchart in FIG. 20, for example, applying the first bonding member 50 (step S1) may be performed after aligning between the substrate 3 and the holding member 4 (step S2) or temporary holding the substrate 3 and the holding member 4 (step S3). For example, applying the second bonding member 60 (step S6) may be performed before aligning between the substrate 3 and the holding member 4 (step S2) or temporary holding the substrate 3 and the holding member 4 (step S3). Each step included in the flowchart in FIG. 20 may be rearranged in various orders.

The imaging apparatus 1 according to this disclosure may be mounted on a moving body. The moving body in this disclosure may include, for example, vehicles, ships, aircrafts and the like. Although the vehicles according to this disclosure include automobiles and industrial vehicles, it is not limited thereto, and may include rail vehicles, campers, airplanes running on runway, and the like. Although the automobiles may include, for example, passenger cars, trucks, buses, two-wheel vehicles, trolleybuses and the like, it is not limited thereto, and may include other vehicles running on roads. Industrial vehicles may include, for example, agricultural and construction industrial vehicles and the like. Industrial vehicles may include, for example, forklifts, golf carts, and the like, but not limited thereto. Although agricultural industrial vehicles may include, for example, tractors, tillers, transplanters, binders, combines, lawn mowers and the like, it is not limited thereto. Although construction industrial vehicles may include, for example, bulldozers, scrapers, loading shovels, crane vehicles, dump trucks, road rollers and the like, it is not limited thereto. For example, vehicles may include human-powered vehicles. Vehicle classification is not limited to the above described examples. For example, automobiles may include industrial vehicles that can travel on the road. Same vehicle may be included in some categories. Ships according to this disclosure may include, for example, jet ski bikes, boats, tankers and the like. Aircrafts according to this disclosure may include fixed-wing airplanes and rotor-wing airplanes.

Drawings used for illustrating the embodiment according to this disclosure are schematic drawings. It is to be noted that the drawings are not necessarily to scale.

Although the embodiment according to this disclosure has been described on the basis of the drawings and the examples, it is to be understood that various changes and modifications may be made easily on the basis of this disclosure by those who are ordinarily skilled in the art. Accordingly, such changes and modifications are included in the scope of the disclosure herein. For example, functions and the like included in each component, each step and the like may be rearranged without logical inconsistency. A plurality of components or steps can be combined into one or divided. Although the embodiment according to this disclosure has been described mainly on the apparatus, the embodiment according to this disclosure can be realized as a method including steps executed by each component of the apparatus. The embodiment according to this disclosure can be realized as a method or program executed by a processor provided to the apparatus, or a storage medium that stores program. It is to be understood that they are included in the scope of this disclosure.

In this disclosure, descriptions of "first" and "second" are identifiers for distinguishing the configurations of this disclosure. In the configurations distinguished by the descriptions of "first" and "second" and the like, the numbers can be exchanged. For example, with respect to the first face and the second face, the identifiers of "first" and "second" can be exchanged. Exchange of identifiers is performed simultaneously. The configurations are distinguished even after the identifiers are exchanged. Identifiers may be omitted. After identifiers are omitted, the configuration is distinguished by a reference sign. Order of the configuration and existence of low-numbered identifier shall not be determined only on the basis of description of identifiers such as "first" and "second" in this disclosure.

In this disclosure, the X-axis, the Y-axis and the Z-axis are provided for convenience of description, and may be replaced with each other. The configuration according to this disclosure has been described by using an orthogonal coordinate system of X-axis, Y-axis and Z-axis. The positional relationship of each component according to this disclosure is not limited to be orthogonal relationship.

The invention claimed is:

1. An imaging apparatus, comprising:
    an imaging optical system including at least one optical element;
    an image sensor configured to capture an object image formed by the imaging optical system;
    a substrate including a first face on which the image sensor is mounted and a second face located on another side of the first face across the substrate;

a holding member configured to hold the imaging optical system, the holding member including a substrate bonding face that is opposite to the first face of the substrate;
a first bonding member configured to bond at least a part of the first face of the substrate to the substrate bonding face; and
a second bonding member configured to bond at least a part of the second face of the substrate to the substrate bonding face.

2. The imaging apparatus according to claim 1, wherein at least a part of the first bonding member is located between the substrate and the substrate bonding face.

3. The imaging apparatus according to claim 2, wherein, the substrate has a protrusion;
at least a part of the first bonding member is located between the protrusion and the substrate bonding face; and
the second bonding member is bonded to a portion of the substrate bonding face that does not overlap with the protrusion.

4. The imaging apparatus according to claim 3, wherein the second bonding member is bonded to at least two portions of the substrate bonding face that sandwich the protrusion therebetween.

5. The imaging apparatus according to claim 4, wherein
the substrate has at least one of a bonding hole and a notch, the at least one of the bonding hole and the notch comprising an edge that extends through the substrate from the first face to the second face;
at least a part of the first bonding member is located between the edge of the at least one of the bonding hole and the notch, on the first face of the substrate and the substrate bonding face; and
the second bonding member is bonded to around the edge of the at least one of the bonding hole and the notch on the second face of the substrate, and extends through the at least one of the bonding hole and the notch to a portion of the substrate bonding face that is located inside the edge when viewed in a sideview of the substrate.

6. The imaging apparatus according to claim 3, wherein
the substrate has at least one of a bonding hole and a notch, the at least one of the bonding hole and the notch comprising an edge that extends through the substrate from the first face to the second face;
at least a part of the first bonding member is located between the edge of the at least one of the bonding hole and the notch, on the first face of the substrate and the substrate bonding face; and
the second bonding member is bonded to around the edge of the at least one of the bonding hole and the notch on the second face of the substrate, and extends through the at least one of the bonding hole and the notch to a portion of the substrate bonding face that is located inside the edge when viewed in a sideview of the substrate.

7. The imaging apparatus according to claim 2, wherein
the substrate has at least one of a bonding hole and a notch, the at least one of the bonding hole and the notch comprising an edge that extends through the substrate from the first face to the second face;
at least a part of the first bonding member is located between the edge of the at least one of the bonding hole and the notch, on the first face of the substrate and the substrate bonding face; and
the second bonding member is bonded to around the edge of the at least one of the bonding hole and the notch on the second face of the substrate, and extends through the at least one of the bonding hole and the notch to a portion of the substrate bonding face that is located inside the edge when viewed in a sideview of the substrate.

8. The imaging apparatus according to claim 7, wherein, on a projection plane that passes through a line connecting a center of an image-capturing plane of the image sensor and a center of the second bonding member and is orthogonal to a face of the substrate on which the image sensor is mounted, an orthographic projection of the second bonding member is located within an orthographic projection of the first bonding member.

9. The imaging apparatus according to claim 1, wherein, the substrate has a protrusion;
at least a part of the first bonding member is located between the protrusion and the substrate bonding face; and
the second bonding member is bonded to a portion of the substrate bonding face that does not overlap with the protrusion.

10. The imaging apparatus according to claim 9, wherein
the substrate has at least one of a bonding hole and a notch, the at least one of the bonding hole and the notch comprising an edge that extends through the substrate from the first face to the second face;
at least a part of the first bonding member is located between the edge of the at least one of the bonding hole and the notch, on the first face of the substrate and the substrate bonding face; and
the second bonding member is bonded to around the edge of the at least one of the bonding hole and the notch on the second face of the substrate, and extends through the at least one of the bonding hole and the notch to a portion of the substrate bonding face that is located inside the edge when viewed in a sideview of the substrate.

11. The imaging apparatus according to claim 9, wherein the second bonding member is bonded to at least two portions of the substrate bonding face that sandwich the protrusion therebetween.

12. The imaging apparatus according to claim 11, wherein
the substrate has at least one of a bonding hole and a notch, the at least one of the bonding hole and the notch comprising an edge that extends through the substrate from the first face to the second face;
at least a part of the first bonding member is located between the edge of the at least one of the bonding hole and the notch, on the first face of the substrate and the substrate bonding face; and
the second bonding member is bonded to around the edge of the at least one of the bonding hole and the notch on the second face of the substrate, and extends through the at least one of the bonding hole and the notch to a portion of the substrate bonding face that is located inside the edge when viewed in a sideview of the substrate.

13. The imaging apparatus according to claim 1, wherein
the substrate has at least one of a bonding hole and a notch, the at least one of the bonding hole and the notch comprising an edge that extends through the substrate from the first face to the second face;
at least a part of the first bonding member is located between the edge of the at least one of the bonding hole and the notch, on the first face of the substrate and the substrate bonding face; and the second bonding member is bonded to around the edge of the at least one of the bonding hole and the notch on the second face of the substrate, and extends through the at least one of the bonding hole and the notch to a portion of the substrate bonding face that is located inside the edge when viewed in a sideview of the substrate.

14. The imaging apparatus according to claim 13, wherein, on a projection plane that passes through a line connecting a center of an image-capturing plane of the image sensor and a center of the second bonding member and is orthogonal to a face of the substrate on which the image sensor is mounted, an orthographic projection of the second bonding member is located within an orthographic projection of the first bonding member.

15. The imaging apparatus according to claim 1, wherein a shrinkage ratio when cured of the first bonding member is smaller than a shrinkage ratio when cured of the second bonding member.

16. The imaging apparatus according to claim 1, wherein a bonding strength of the second bonding member is higher than a bonding strength of the first bonding member.

17. The imaging apparatus according to claim 1, wherein the first bonding member is an ultraviolet cured adhesive, and the second bonding member is a thermosetting adhesive.

18. The imaging apparatus according to claim 1, wherein at least a part of the first bonding member is clamped between the substrate and the substrate bonding face.

19. An imaging apparatus manufacturing method, comprising the steps of:

applying a first bonding member between a substrate bonding face of a holding member, configured to hold an imaging optical system including at least one optical element, and at least a part of a first face of a substrate, on which an image sensor configured to capture an object image formed by the imaging optical system is mounted;

curing the first bonding member; and applying a second bonding member across at least a part of a second face of the substrate, the second face being located on another side of the first face across the substrate, and the substrate bonding face; and curing the second bonding member, wherein the substrate bonding face is opposite to the first face of the substrate.

20. A moving body equipped with an imaging apparatus, the imaging apparatus comprising:

an imaging optical system including at least one optical element;

an image sensor configured to capture an object image formed by the imaging optical system;

a substrate including a first face on which the image sensor is mounted and a second face located on another side of the first face across the substrate;

a holding member configured to hold the imaging optical system, the holding member including a substrate bonding face that is opposite to the first face of the substrate;

a first bonding member configured to bond at least a part of the first face of the substrate to the substrate bonding face; and a second bonding member configured to bond at least a part of the second face of the substrate to the substrate bonding face.

* * * * *